United States Patent [19]
Lindelef et al.

[11] 3,955,731
[45] May 11, 1976

[54] CONVERTIBLE TOP CARRIER-LIVING COMPARTMENT STORAGE UNIT FOR PASSENGER VEHICLES

[76] Inventors: Wesley H. Lindelef; Helen M. Lindelef, both of P.O. Box 964 25215 Oak St., Apt. 5, Lomita, Calif. 90717

[22] Filed: July 29, 1971

[21] Appl. No.: 167,354

[52] U.S. Cl. .......................... 224/42.1 E; 135/1 A; 296/23 MC
[51] Int. Cl.² ...................... B60R 9/04; E04B 1/347
[58] Field of Search ............. 224/42.03 R, 42.03 A, 224/42.1 E, 42.1 D, 42.1 R, 42.01; 135/29 R, 1 A, 5 A; 296/23 MC, 23 A

[56] References Cited
UNITED STATES PATENTS

| | | | |
|---|---|---|---|
| 2,600,799 | 6/1952 | Otvos | 135/1 A UX |
| 2,640,204 | 6/1953 | Cutler | 135/1 A UX |
| 2,917,059 | 12/1959 | Emanuelson | 135/1 A |

FOREIGN PATENTS OR APPLICATIONS

| | | | |
|---|---|---|---|
| 887,384 | 11/1943 | France | 296/1 S |
| 1,395,376 | 5/1964 | France | 224/42.1 E |
| 257,396 | 4/1963 | Australia | 224/42.1 F |

*Primary Examiner*—Robert J. Spar
*Assistant Examiner*—Jerold M. Forsberg

[57] ABSTRACT

A streamlined unit for removable installation atop passenger vehicles and comprised of a monocoque structure applicable to the perimeter of a vehicle roof to overlie the same and provide a storage chamber closed by an expansible closure which is conditioned to be shut by means of a superimposed ladder-rack and when expanded to provide a platform receiving and stabilized by said ladder-rack for ingress and egress; said platform condition providing a deck adapted to support the erection of a living compartment.

2 Claims, 10 Drawing Figures

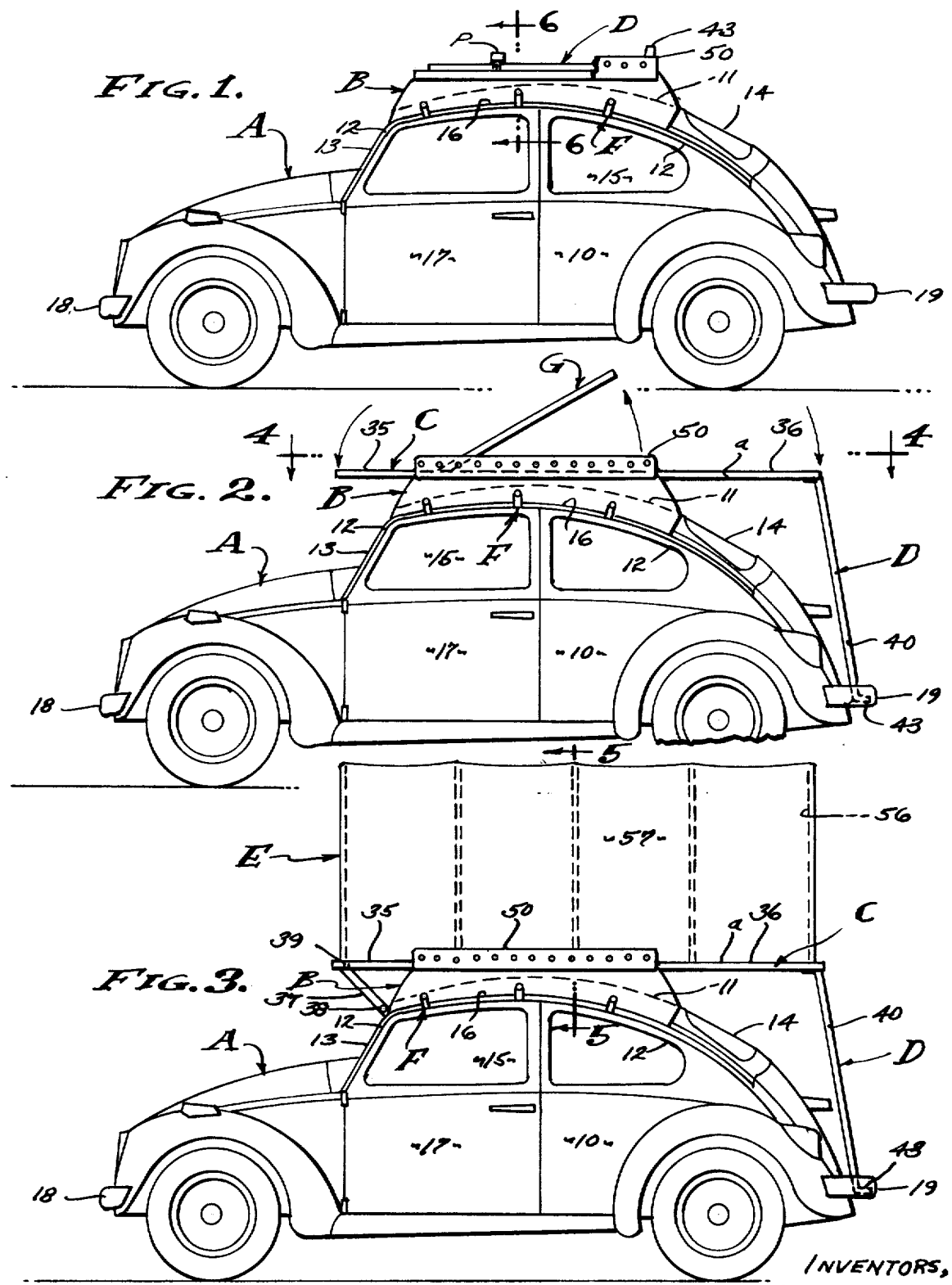

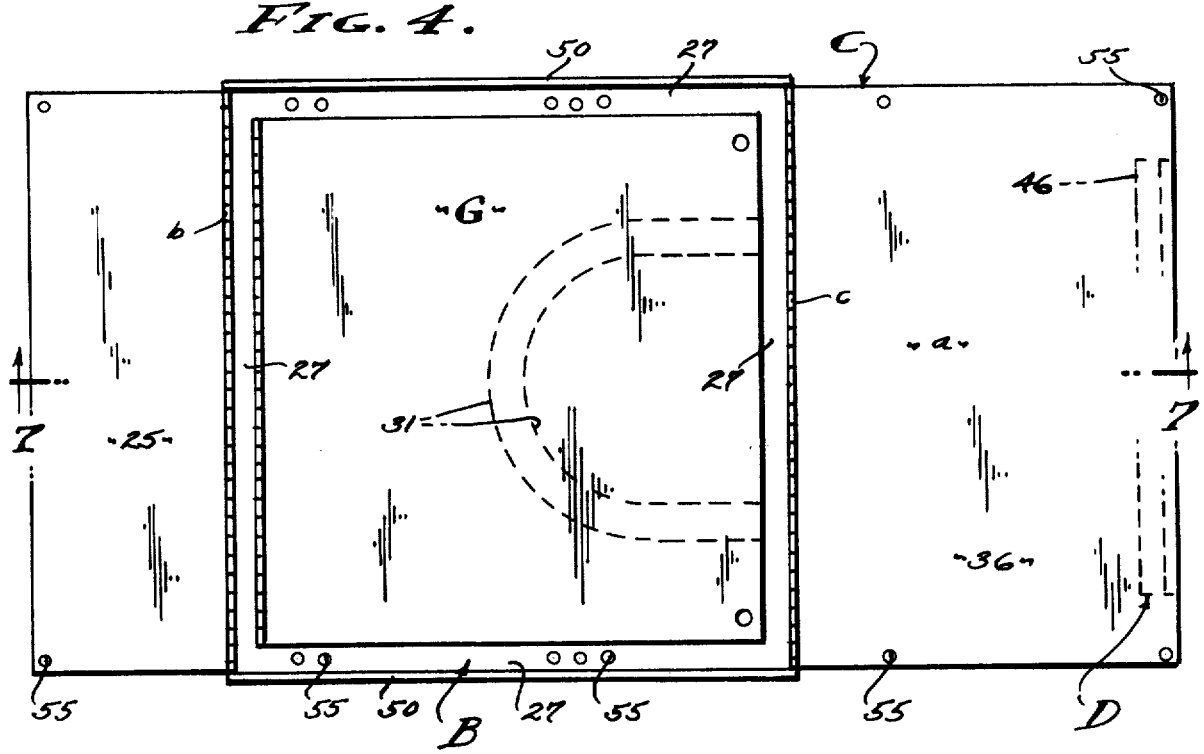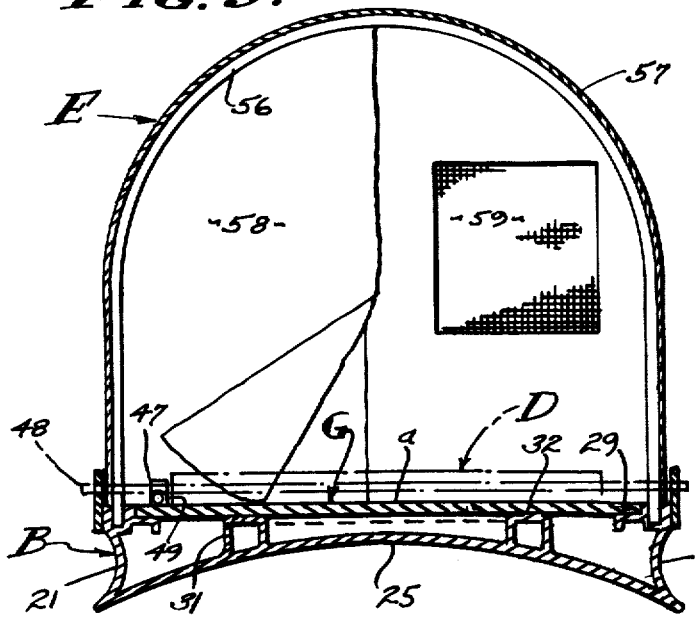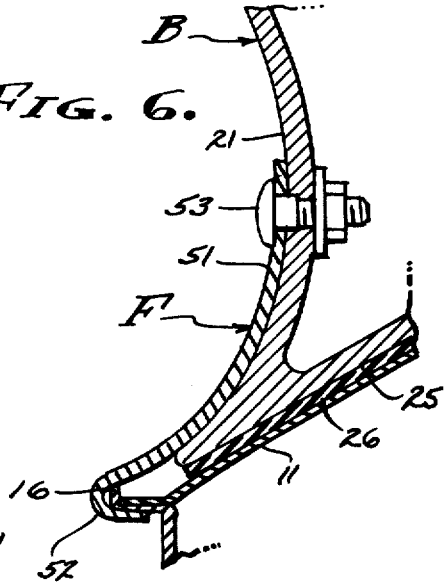

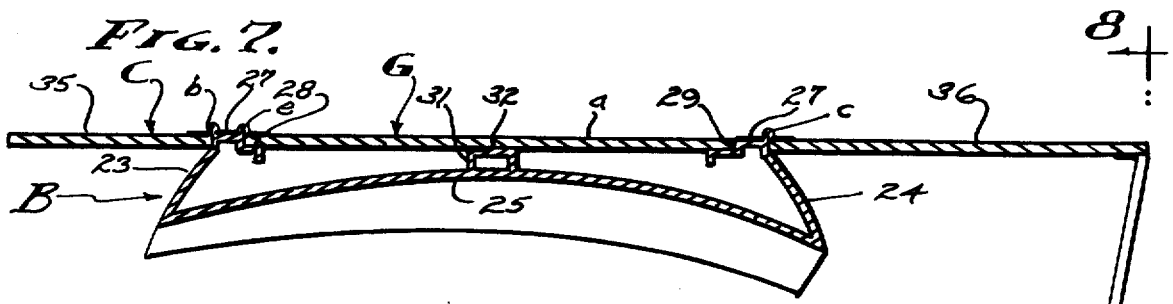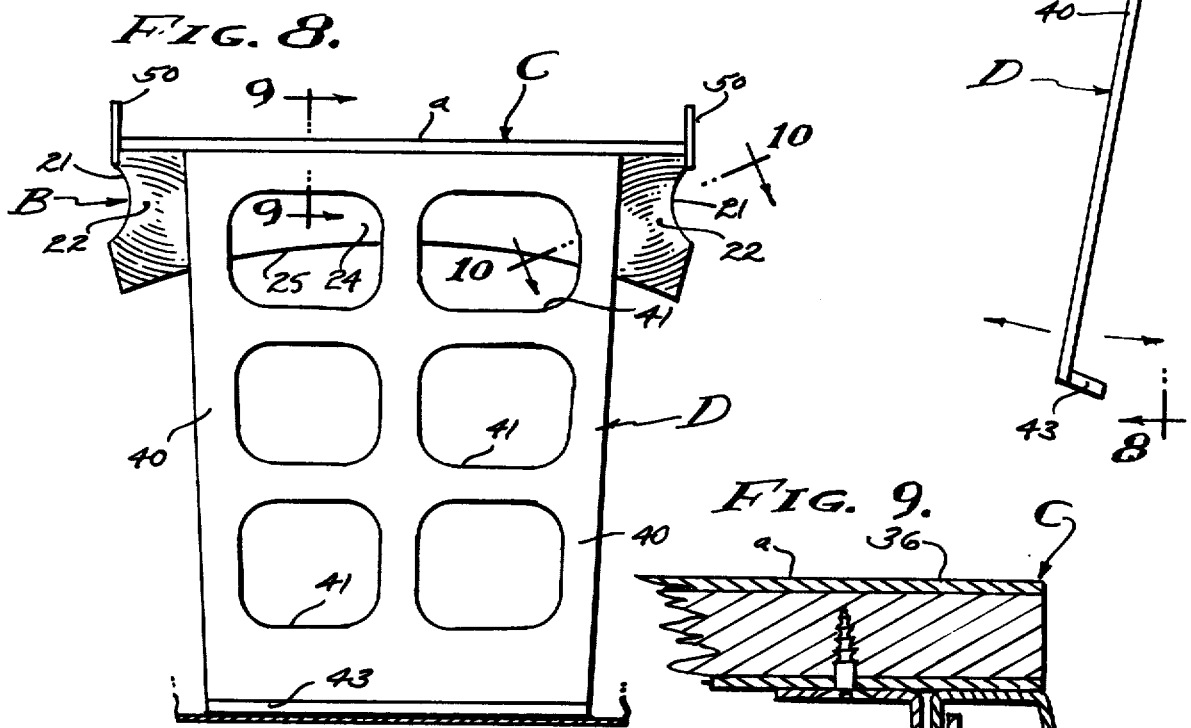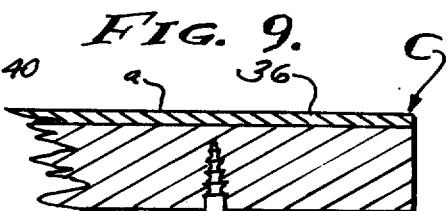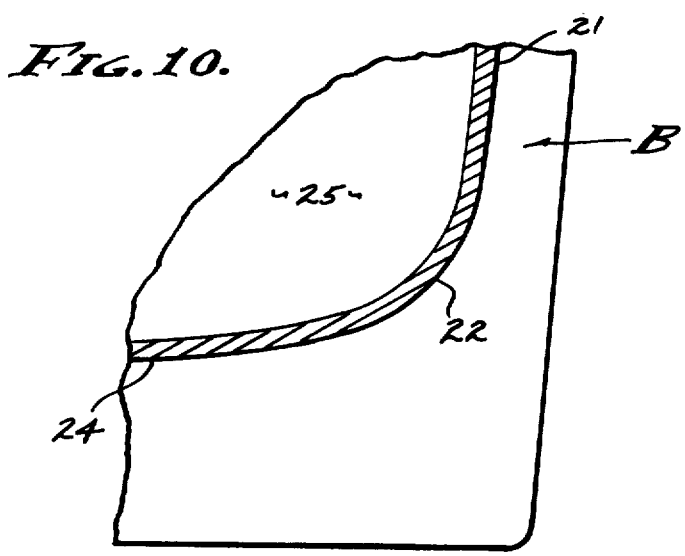

3,955,731

CONVERTIBLE TOP CARRIER-LIVING COMPARTMENT STORAGE UNIT FOR PASSENGER VEHICLES

Reference is made to Disclosure Document No. 002771 filed Aug. 17, 1970 which describes, fundamentally, the concept herein disclosed.

BACKGROUND

The use of passenger vehicles for touring, and especially for overnight excursions, is wide-spread; and sleeping facilities are either limited or nonexistent in most vehicles. A prevailing factor is the widespread use of compact vehicles which do have limited space, both for passengers and for luggage and for other paraphernalia; and it is this class of vehicle to which the present invention is particularly directed; it being a general object of this invention to provide a convertible top carrier-living compartment storage unit for augmenting the utility of passenger vehicles, and particularly small compact vehicles.

An object of this invention is to provide a monocoque structure of low drag configuration for cooperative attachment onto a vehicle body and adapted to the plurality of purposes herein referred to. With the present invention the monocoque structure is an integral shell which coextensively overlies the roof of the vehicle and which has marginal portions supportably engaged with the said roof at the perimeter thereof. The contours of the monocoque shell are continuations of the vehicle mold lines, and to the end that there is a fairing of contour lines merging the vehicular body into the attached unit shell.

Another object of this invention is to provide a compartmented structural shell for attachment to the roof of a vehicular body and wherein there is a closure therefor which is expansible into a platform that establishes a coplanar deck. With the present invention the monocoque shell closure has two conditions, one that closes the chambered shell to establish a storage chamber therein and another that extends the upper plane thereof to a practical length as a deck.

It is also an object of this invention to provide a multi-purpose element in the form of a ladder-rack which cooperatively coacts with the aforementioned closure of the compartmented body shell, to provide ingress and egress, as well as support, and to provide a tie-down for external luggage simultaneously with tie-down of said closure.

DRAWINGS

The various objects and features of this invention will be fully understood from the following detailed description of the typical preferred form and application thereof, throughout which description reference is made to the accompanying drawings, in which:

FIGS. 1, 2 and 3 are like side elevations of a typical passenger vehicle equipped with the convertible top carrier-living compartment-storage unit of the present invention, FIG. 1 showing the unit conditioned for traveling, FIG. 2, showing the unit in the process of expansion, and FIG. 3 showing the unit expanded and stabilized as a living compartment.

FIG. 4 is an enlarged plan view taken as indicated by line 4—4 on FIG. 2.

FIG. 5 is a transverse sectional view taken as indicated by line 5—5 on FIG. 3.

FIG. 6 is an enlarged detailed sectional view taken as indicated by lines 6—6 on FIG. 1.

FIG. 7 is a longitudinal sectional view taken as indicated by line 7—7 on FIG. 4.

FIG. 8 is a elevational view taken as indicated by line 8—8 on FIG. 7.

FIG. 9 is an enlarged detailed sectional view taken as indicated by line 9—9 on FIG. 8; and FIG. 10 is an enlarged fragmentary plan sectional view taken as indicated by line 10—10 on FIG. 8.

PREFERRED EMBODIMENT

This invention relates to passenger vehicles wherein luggage capacity is limited and wherein the passenger accommodations are restricted to the comforts of driving. Therefore, luggage and large paraphernalia must be carried externally on the vehicle. Although vehicles are variously typed as coupes and sedans, etc., it is to be understood that the convertible unit herein disclosed is universally adapted to any style vehicle having a structurally sound roof that is capable of carrying weight; there being a multitude of car bodies to which the present invention can be customized. Thus, at the outset, it is each individual body to which this unit is matched for cooperative coupled engagement, and preferably to stock or production automobiles which are manufactured in large quantity. In other words, this convertible unit is customized for each auto and model or style to which it is to be applied. For instance, this convertible top carrier-living compartment-storage unit is particularly utilitarian as used with the small compact automobile shown in the drawings; forming a top carrier having minimum drag for its spaciousness and capacity to be expanded into a spacious living compartment.

Referring sequentially to FIGS. 1, 2 and 3 of the drawings, this top carrier has two extreme conditions; firstly, the condition shown in FIG. 1 wherein the unit is collapsed to close the storage compartment for storage of the living compartment components therein and the ladder-rack disposed for transporting luggage upon the exterior of the vehicle; and secondly the condition shown in FIG. 3 wherein the unit is expanded to provide a platform and the ladder-rack disposed for ingress and egress thereto. As is clearly shown, the platform is the base of a living compartment in the nature of a collapsible house or tent which is erected and entered into via the ladder-rack supported from the bumper of the vehicle. FIG. 2 illustrates the transition between the conditions of FIG. 1 and FIG. 3, showing the direction of movement of the movable members creating the deck employed in the FIG. 3 condition.

The automotive vehicle A to which the top carrier is applicable is a conventional four-wheeled vehicle having a sedan body 10 with a roof 11 supported by corner posts 12 between which there are windows and namely front and rear windows 13 and 14 and side windows 15. At the line of joinder between the roof 11 and the supporting post structures there are opposite side gutters 16 forming a contoured and upwardly opening channel or groove which is readily adapted to supportably receive the top carrier unit. The doors 17 and/or side windows 15 open independently of the said side gutters, which fair into and extend along the corner posts 12; the auto body being an integrated structure and streamlined enclosure for the passenger compartment, there being fair transition of body contours from the plane of the side windows and plane of the front window 13 over or along the top 12 and through to the back window 14. Further, the body contours continue to the front and rear bumpers 18 and 19 of the vehicle, and in the case illustrated the rear bumper 19 is used for support and as the first step of the ladder for entry into the living compartment to be erected on the platform to be described.

With a vehicle as generally described above, we have provided the novel concept of a top carrier which is convertible between the aforementioned conditions and which involves a monocoque body B, a sectional cover C, a ladder-rack D, a collapsible enclosure E, and anchor means F; all of which are cooperatively related and combined to serve the multiple functions of the apparatus. The body B is monocoque for various advantageous reasons; namely for strength, for tightness, for drag reduction and for maximum storage space that can be sealed for dust-proofing. The cover C is sectional and hinged for expansible movement to extended coplanar positions in the plane of a removable top G that underlies said cover sections when the unit is collapsed, the longitudinal extent of the sections being determined by the height of the ladder-rack which is held within the over-all length of the body B. The ladder-rack D is of the dimensions above described and is secured over the cover sections and removable top G when in the closed condition. When in the expanded condition, the ladder-rack D is the structural support for the extended outer rear end portion of the platform. The collapsible enclosure E is a covering of canvas or the like held to the desired form by means of frames socketed into the platform and erected upon said platform to provide the living compartment. And, the anchor means F is a burglarproof hold-down structure which can be securely locked in so as to tie the top carrier unit to the auto top 11.

The monocoque body B which characterizes the present invention and which provides the aerodynamic structure and enclosed storage space of the top carrier, and which cooperatively supports the means C through G to be separately described, is formed and/or molded to the general configuration shown and establishes, essentially, a fair continuation of the vehicle body 10. As is clearly illustrated, the compound curvatures of the vehicle body 10 merge into complementary compound curvatures of the monocoque body B. To these ends therefore, the body B has side walls 21 that merge tangentially with the vehicle roof 11 at the side gutters 16, and has front and rear walls 23 and 24 that merge tangentially at the vehicle windows 13 and 14 respectively. The side walls 21 extend longitudinally while the front and rear walls 23 and 24 extend transversely, said walls being joined at and above the four corner posts 12 of the vehicle body A by convexly rounded corners 22 also merged tangentially with the vehicle top 11. In carrying out the invention, the walls 21 and 22, flare upwardly and outwardly to a deck plane a spaced substantially above the vehicle roof 11, and are therefore concavely flared at the exterior adding lateral rigidity to the structure, while the corners 22 are convexly formed at the exterior adding columnar rigidity. Therefore, it will be seen that the monocoque body B flares upwardly and outwardly into an expanded deck plane a wider than and longitudinally coextensive with the vehicle roof 11.

In accordance with the present invention, the monocoque boody B has a concave-convex bottom 25 which coextensively overlies the vehicle roof 11, contoured to be complementary with said roof and to be supported thereupon. In order to preserve the finish and beauty of the vehicle roof, a blanket and/or coating 26 or soft material is disposed between the vehicle roof and bottom 25, preferably secured to and carried by the latter.

The monocoque body B is rectangular in plan view and has reinforced top margins, preferably of uniform cross section with an inturned deck 27 and downwardly recessed rabbets 28 terminating in an upwardly disposed deck supporting flange 29; all of which adds to the rigidity of the body B as a framework. As shown, the reinforced margins leave the major area of the deck plane a open for reception into the rabbets of the removable top G, a rectangular panel that is carried upon the flanges 29 to be flush with the deck plane a.

The upwardly opening chamber formed by the above described monocoque shell or body B is compartmented and the top G braced against depression by means of an inverted channel formed upward from the bottom 25 and having vertically disposed sides 31 and a top 32 extending therebetween to support the underside of the removable top G. As shown, this reinforcing channel reaches from the rear wall 23 and into the center of the body B, the top 32 thereof being coplanar with the underside of the top G which rests thereupon. In accordance with the invention, the channel sides 31 and top 32 are integral continuations of the bottom 25 of the monocoque body B.

The sectional cover C which is hinged to the monocoque body B is comprised of fore and aft panels 35 and 36 which mate so as to coextensively overlie the top plane a of the body B when in the condition shown in FIG. 1, and which extend oppositely so as to expose and simultaneously extend or expand the top plane a of the body B when in the condition shown in FIG. 3. In practice therefore, the fore panel 35 is hinged on an axis b disposed adjacent to front wall 23 and in the plane a; while the aft panel 36 is hinged on an axis c disposed adjacent to rear wall 24 and also in the plane a. The two axes b and c are transverse and parallel one with the other. As is clearly shown, the panels 35 and 36 are rectangular and transversely coextensive with the width of body B, and they come together across the center of the body when resting upon the margins thereof and/or upon the removable top G which is captured beneath the two said panels when in the condition of FIG. 1.

The fore and aft panels 35 and 36 are extended to the condition of FIG. 3 by moving the same through the arcuate motions illustrated in FIG. 2; the fore panel 35 to be supported upon struts 37; and the aft panel 36 to be supported upon the ladder-rack D next to be described. In the preferred form, the front panel 35 is held in its coplanar forwardly extended position of FIG. 3 by means of the strut or struts 37 which extend from the panel at a point removed from the hinge axis b and to the front post 12 of the vehicle body A. The point of attachment of struts 37 is substantially normal to the posts 12 and/or normal to the tangent of any curvature thereof; and consequently no tendency to slip or to move up or down, and thereby minimizing the attachment thereto. A simple clamp or screw 38 is provided to maintain position of the strut 37 upon the post 12, attached to the extended gutter 16, while the strut 37 is pinned at 39 into the panel 35.

The ladder-rack D is a unique multi-purpose device cooperating with the sectional cover C to secure the same as a closure or to support the same as a deck, while also serving as a rack in the closure securement condition and as a ladder in the deck support condition. That is, the element D is a rack when conditioned as shown in FIG. 1 to secure the cover C for travel and the element D is a ladder when conditioned as shown in FIG. 3 to support the aft panel 36 of the closure C. In practice therefore, the ladder-rack D is an elongated rectangular member with parallel side rails 40 having transverse steps 41 established by right and left lightening holes with reinforcing flanges 42. The opposite ends of the ladder-rack D are normal, the top end being releasibly hinged to the swinging edge of aft panel 36 on an axis $d$, and the foot and free end of the ladder-rack being provided with a supporting foot 43, or the like, contoured to rest upon or within and/or upon the bumper 19 and its supporting bracket.

A feature of the ladder-rack D and sectional closure C combination is that the terminal top end of the ladder-rack is adapted to be disengageably secured to the swinging end of the aft closure section 36. To these ends therefore, the ladder-rack D is provided with an inturned lock flange 45 adapted to be revolved into locked engagement with a hooked rail 46 extending transversely of the rear margin of closure section 36 (see FIG. 9). The ladder-rack D is revolved as is indicated by the arrows in FIG. 7, thereby to be engaged or disengaged, and is positioned as shown in FIGS. 3 and 9 for support of the section 36 in the plane $a$. The "rack" installation is shown in FIGS. 1 and 5 wherein a padlock P is passed through a tongue 47 depending from a lock bar 48 and through a pair of ears 49 projecting from the closure section 35 and 36 respectively. The said ears 49 embrace the tongue 47 with openings therethrough aligned when the sections 35 and 36 are closed, and the lock bar 48 extends transversely through openings in the ladder-rack D and complementary openings in opposite tiedown rails 50 (see FIG. 5). Thus, the unit can be positively secured as by means of the padlock P when the sectional closure C and ladder-rack D are conditioned as shown in FIG. 1; and when conditioned as shown in FIG. 3 the two panel sections 35 and 36 are positively coplanar with the plane $a$ of body B.

Referring to the anchor means F that secures the monocoque B to the vehicle roof 11, a plurality of such means is used along the opposite side gutters 16; each substantially as shown in FIG. 6. An anchor strap 51 is made of sheet material contoured to the side configuration (21) to fit contiguously, there being a hook 52 at its lower end to embrace the under side of the gutter 16. A screw fastener 53 penetrates the strap and side 21 and holds the strap to the side with the hook 52 engaging said gutter. Three such installations are shown along each side of the unit.

From the foregoing it will be seen that the monocoque body B is a relatively light weight structure wherein thin wall sections are disposed and related to give great supporting strength to the deck plane, while the extensible portions or deck panels 35 and 36 are braceably supported by the struts 37 and ladder-rack D. The placement of the body B upon the vehicle roof 11 is a simple matter and its securement in said placement is by the anchor means F that attaches the body to the gutters 16. Although the anchors can vary in construction, the close proximity of the vehicle doors moving beneath the gutters 16 requires anchor hooks 52 of minimal thickness, as shown.

The collapsible enclosure E is a tent-like structure that is of knock-down construction adapted to be erected upon the platform or deck comprised of the removable top C and panel sections 35 and 36 disposed in the plane $a$. As shown, the side margins of the panels 35 and 36 and of the body B are provided with upwardly opening sockets 55 releasably receiving the terminal ends of bows 56 that extend upwardly and arch across the platform, to be supported thereby at opposite sides of the deck. A cover 57, including opposite sides and a top is carried over the said bows and secured as by means of snaps at the outside periphery of the structure. As shown, end closures 58 with portals 59 are provided for ventilation and access, especially at the rearward end of the enclosure where persons enter and exit via the ladder-rack D which extends upward from the supporting bumper 19 of the vehicle A.

As will be seen from the proportioning of the enclosure elements, they are to be stored within the confines of the compartment formed in the monocoque body B below the removable top G that is hinged to body B along the forward edge; and all of which is made secure as hereinabove described.

Having described only a typical preferred form and application of our invention, we do not wish to be limited or restricted to the specific details herein set forth, but wish to reserve to ourselves any modifications or variations that may appear to those skilled in the art, we claim:

1. A top carrier for passenger vehicles and adapted to be supportably fitted to the vehicle roof and expansible over both the front and rear ends of the vehicle, and comprising, a body with a top deck in a plane spaced above the vehicle roof and with a bottom complementary to and supportably engageable upon said roof, anchor means securing the body to the vehicle roof, a flat front cover hinged to the front edge of the top deck to swing from a condition overlying a front portion of said top deck to a condition extending to overlie the front end of the vehicle, there being means supporting the front cover in said extended condition coplanar with said top deck, a flat rear cover hinged to the rear edge of the top deck to swing from a condition overlying a rear portion of said top deck to a condition extending to overlie the rear end of the vehicle, there being a multi-purpose cover securement and support means firstly securing each of the front and rear covers in said top deck overlying condition and secondly supporting the rear cover in said extended condition coplanar with said top deck.

2. The top carrier for vehicles as set forth in claim 1 wherein the multi-purpose securement and support means is a ladder-rack firstly secured as a rack coextensively over the front and rear covers when in said deck overlying condition and secondly as a ladder with rungs and depending from the rear cover to a lowermost supporting structure of the vehicle when in said extended condition.

* * * * *